United States Patent [19]
Lightfoot

[11] 3,911,648
[45] Oct. 14, 1975

[54] SADDLE TREES AND SADDLES

[75] Inventor: Robert Oscar Lightfoot, Croydon, England

[73] Assignee: White Polytechniques Limited, Hounslow, England

[22] Filed: Sept. 10, 1973

[21] Appl. No.: 395,504

[52] U.S. Cl. .................................................. 54/44
[51] Int. Cl.² ....................................... B68C 1/00
[58] Field of Search ................................ 54/44, 37

[56] References Cited
UNITED STATES PATENTS

| 1,462,885 | 7/1923 | Hawkins | 54/44 |
|---|---|---|---|
| 2,153,326 | 4/1939 | Crouter | 54/44 |
| 3,044,234 | 7/1962 | Baldwin | 54/44 |
| 3,153,887 | 10/1964 | Bohlin | 54/37 |
| 3,157,976 | 11/1964 | Ellsworth | 54/44 |
| 3,293,828 | 12/1966 | Hessler | 54/44 |
| 3,343,338 | 9/1967 | Stubben | 54/44 |
| 3,529,402 | 9/1970 | Queen | 54/44 |
| 3,698,608 | 10/1972 | Entwistle | 54/44 |
| 3,712,024 | 1/1973 | Nankivell | 54/44 |

*Primary Examiner*—Louis G. Mancene
*Assistant Examiner*—J. Q. Lever
*Attorney, Agent, or Firm*—Karl W. Flocks

[57] ABSTRACT

This invention provides a saddle tree moulded in a two part operation and having a first rigid part and a second resiliently compressible part, the final part being used as an insert in the mould for the second part, both parts of the tree preferably being of self skining polyurethane and the first part preferably comprising a neck with points, a waist and seat portion constituted by an open framework.

4 Claims, 3 Drawing Figures

SADDLE TREES AND SADDLES

BACKGROUND OF THE INVENTION

This invention relates to saddle trees and to saddles and to a method of making saddle trees and saddles.

British Patent specification No. 1,245,445 and the Specification of U.S. Pat. No. 3,888,070 disclose saddle trees formed primarily of foamed plastic material and discuss a variety of constructions and methods of manufacture.

In this specification it will be assumed that a saddle tree has a neck portion with depending points, a seat portion rearward of the neck portion and a cantle portion rearwardly of the seat portion.

SUMMARY OF THE INVENTION

According to one aspect of the present invention there is provided a saddle tree formed partly of rigid material and partly of resiliently compressible material to provide a tree having a substantially rigid neck and points and a cushioned seat. The rigid material and the resiliently compressible material are both self skinning foamed plastic materials bonded together. Preferably the tree is capable of resiliently flexing in the region of the seat.

According to another aspect of the present invention, there is provided a saddle tree of plastic material in which at least a part of the seat portion is resiliently compressible throughout the thickness of the tree and at least a part of the remainder of the tree is substantially rigid.

Another aspect of the present invention provides a saddle tree of plastic material comprising a seat portion the major part of which is surrounded by a framework incorporating a neck portion and a cantle portion said major part of the seat portion extending from the upper to the lower surface of the tree and being of a material which is resiliently compressible.

A further aspect of the present invention provides a saddle tree comprising a first rigid part having a neck portion joined to a cantle portion by a pair of spaced apart members to define an annular frame surrounding a major part of the seat portion and a second resiliently compressible part bonded to the first part and filling the annular frame.

The present invention also provides a method of making a saddle tree (according to any one of the preceding four paragraphs) in which a substantially rigid first part of the tree is moulded of self skinning foamed plastic material and thereafter a second resiliently compressible part of self skinning foamed plastic material is bonded to the first part in a moulding operation in which the first part constitutes part of or an insert in the mould.

The present invention also envisages joining all or part of a leather or plastic covering which is joined to the tree in the same or further moulding operations to provide a part finished or wholly finished saddle.

DETAILED DESCRIPTION OF VARIOUS EMBODIMENTS OF THE INVENTION

The above and other aspects of the present invention will be described by way of example with reference to the accompanying drawing in which.

Figure 1:
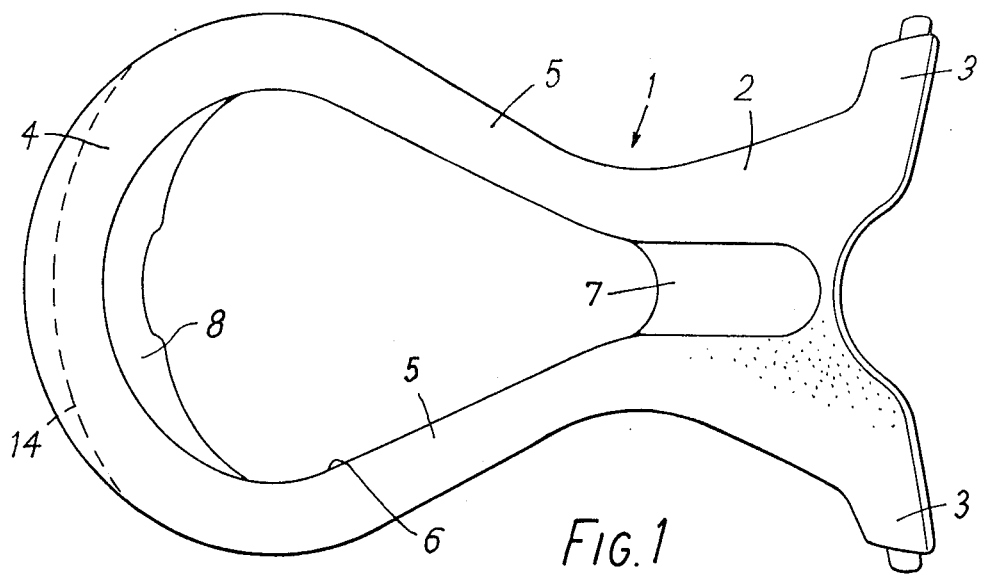
FIG. 1 is a plan view of a rigid part of a saddle tree according to the present invention.
Figure 2:
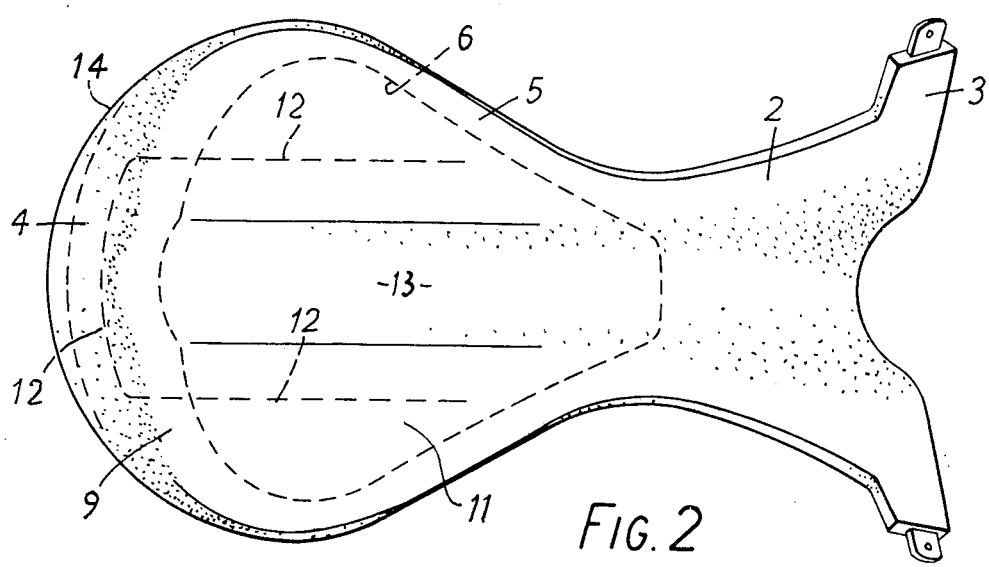
FIG. 2 is an underneath plan view of the saddle tree incorporating resiliently compressible material constituting a major part of the seat portion and FIG. 3 is a side elevational view of the tree of FIG. 2.

Referring to the drawings a saddle tree indicated generally at 1 comprises a first rigid part having a neck 2, points 3 and a cantle portion 4 joined to the neck by spaced apart members 5 all constituting an annular framework having an aperture 6. A recess 7 extends along the upper surface of the neck from the forward end of the aperture 6. At its rear end the aperture is bonded by an inclined wall 8 so that the rigid material of the cantle 4 extends to an underneath part 9.

Figure 3:
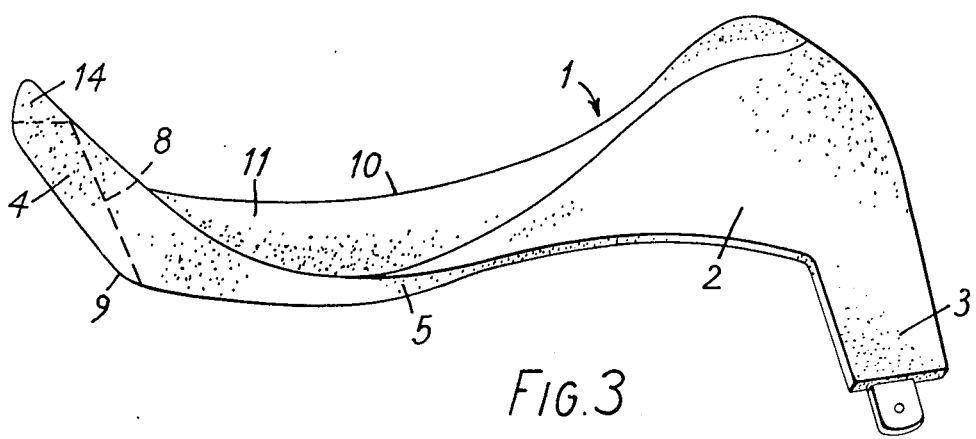

The rigid part of the tree is moulded from self skinning polyurethane foam plastic material (preferably that known by the Registered Trade Mark 'Duramin'). The upper part of the mould is removed and replaced by a mould part (not shown) following the outline of the desired upper surface 10 (FIG. 3) of the tree. A further moulding operation is then carried out in which the aperture 6 is filled with a different grade of self skinning polyurethane foam plastics material (also Duramin) to provide a resiliently compressible cushion 11 extending completely through the tree from the upper to the lower surface thereof in the region of the seat portion. The cushion also extends over the members 5 and the upper surface of the cantle 4 to merge with the edges thereof. It also extends along the recess 7 to provide padding towards the front of the tree. On the undersurface of the tree the edge of the aperture 6 has been shown by a chain line. In practice the cushion material merges substantially indistinguishably with the undersurface of the rigid part of the tree. It will be understood that by extending the cushion material completely through the tree extra comfort is afforded to a rider. At the same time the lower surface of the members 5, the part 9 of the cantle 4 and the neck of the tree enable a seat cover (not shown) to be stretched over the tree and tacked in the conventional manner. Furthermore by having the cushion material extending to the lower surface of the tree enables conventional additional padding (the positions of which are indicated by chain lines 12) to be moulded at the same time on each side of the longitudinal depression 13 and across the lower part of the cantle 4.

The rigid part of the tree can be formed to be very strong so resisting breakage should a horse roll on its saddle but by virtue of the members 5 it is particularly flexible. These members are capable of flexing over a distance of several inches to give a 'sprung' tree. If desired the upper part 14 of the cantle could be formed integrally with the cushioning material.

It will be understood that a leather or plastic seat cover could be provided in the final moulding process together with a cover for the lower part of the tree so obviating a considerable amount of conventional saddlery work in making a finished saddle.

I claim:
1. A saddle tree comprising
   a seat portion including
      a framework of rigid material incorporating a neck portion and a cantle portion connected by relatively thin flexible members defining an annular frame,
   and a major part of said seat portion of resiliently compressible material bonded over said frame- work and filling said annular frame to a thickness substantially fully from the upper to the lower surfaces of the saddle tree.

2. A saddle tree according to claim 1, in which the tree is capable of resiliently flexing in the region of said seat portion.

3. A saddle tree according to claim 1, in which said rigid material and said resiliently compressible material are formed from self-skinning foamed plastic material.

4. A saddle tree comprising a seat portion including an annular framework of rigid material, and a major part of said seat portion of resiliently compressible material bonded over said framework, filing said annular framework and forming a thickness of said resiliently compressible material substantially the full thickness of the saddle tree over a major portion of said seat portion.

* * * * *